3,196,988
SINGLE TUBE TYPE SHOCK ABSORBERS
William Kenneth Wasdell, Thimble End Farm, Oxleys Road, Wishaw, Sutton Coldfield, England
Filed Oct. 2, 1963, Ser. No. 313,257
8 Claims. (Cl. 188—100)

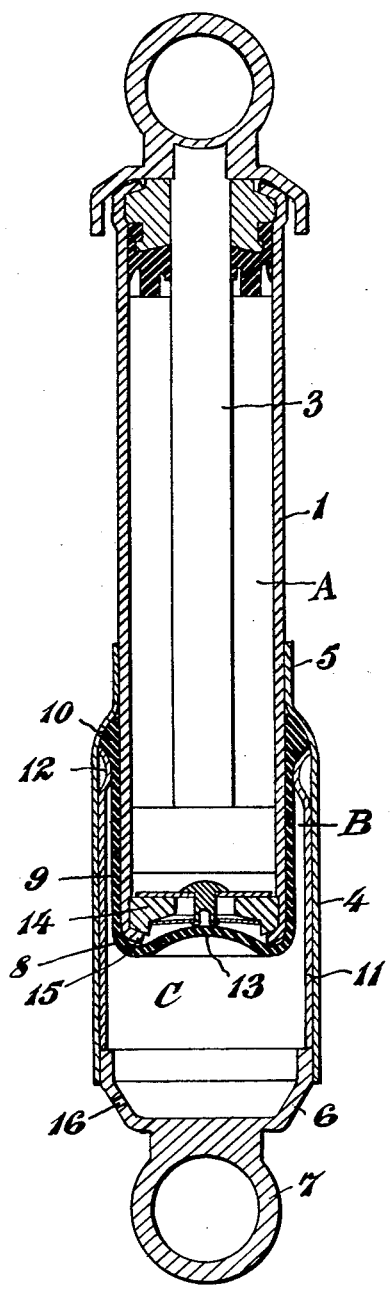

This invention relates to shock absorbers of the kind comprising a valved piston mounted in a working chamber refined within a tube for axial movement against the resistance of fluid filling the working chamber, a piston rod extending from the piston through sealing means at one end of the working chamber, a valve assembly, hereinafter called the foot valve, disposed at the other end of the working chamber for permitting a flow of fluid from the working chamber into a recuperation chamber defined within an extension of the tube beyond the foot valve to compensate for the displacement of the variable length of the piston rod within the working chamber, and a flexible sack disposed within the recuperation chamber for separating the foot valve from the atmosphere which is admitted to the recuperation chamber. A shock absorber according to the above definition is commonly known as a single tube type shock absorber and is hereinafter referred to as of the kind specified.

The present invention has for its primary object the adaptation of a shock absorber of the kind specified for mass production at low cost without sacrifice to the efficiency of operation of which this kind of shock absorber is capable.

The invention consists of a shock absorber of the kind specified, characterised in that the recuperation chamber is defined by a second tube co-axially surrounding the first tube with one end of the second tube fastened to the exterior of the first tube and the opposite end of the second tube extending beyond the first tube and closed by a cap, an annular space created between the two tubes accommodating the skirt of an elastic sack enclosing in fluid-tight manner the end of the first tube.

One example of the practical realisation of the invention is described with reference to the accompanying drawing which illustrates in longitudinal cross-section a shock absorber according to the invention.

In the illustrated embodiment of the invention a thin walled steel tube 1 defining the working chamber A of a shock absorber of the kind specified has its end remote from the piston rod 3 co-axially surrounded by a second steel tube 4 which is reduced in diameter at one end 5 and welded to the exterior of the first tube 1 so as to create an annular space B between the exterior of the first tube 1 and the interior of the second tube 4. The second tube 4 projects beyond the end of the first tube 1 and is closed by an internally fitting steel cap 6 carrying an eye 7 or stud for the connection of this end of the shock absorber to a part of a vehicle wheel suspension.

The interior of the second tube 4 defines the recuperation chamber C of the shock absorber and accommodates a sack 8 for separating the fluid medium which fills the working chamber A from the atmosphere which is admitted to the recuperation chamber C. The sack 8 is composed of an elastic flexible material, such as rubber nitrile, and is of cup-like shape having a cylindrical skirt 9 which is a snug fit over the whole of the cylindrical surface of the first tube 1 enclosed by the second tube 4 and has an outwardly beaded end 10 located in the angle between the first and second tubes 1 and 4 in the vicinity of their connection. A cylindrical sleeve 11 disposed co-axially between the skirt 9 of the sack and the inner wall of the second tube 4 with one end of the sleeve abutting the cap 6 and the other end of the sleeve 11 wedging the bead 10 of the skirt into the angle between the tubes 1 and 4 serves to ensure a fluid-tight connection of the sack with the tubes. Preferably the end of the sleeve 11 in contact with the sack is radiused as shown at 12 to present a smooth surface to the sack. The central area 13 of the sack overlies the foot valve 14 which is conveniently retained in the counter-bored end of the working chamber tube 1 by inturning the end of the first tube as shown at 15 and also thereby radiusing the end of the first tube so as to avoid damage to the sack 8. The central area 13 of the sack is dished convexly towards the foot valve 14 so that as fluid medium passes from the working chamber A through the foot valve 14 into the interior of the sack 8 the central area 13 is first flattened so ensuring the admission of the fluid between the adjacent walls of the sack 8 and first tube 1 and thus avoiding rupture of the sack 8 due to its becoming trapped on the exterior of the first tube with stretching confined to the central area of the sack as would probably occur with a flat or concave ended sack.

To maintain atmospheric pressure in the recuperation chamber C the cap 6 can be vented through a drilled hole 16. Alternatively, the interior surface of the tube 4 or the exterior surface of the skirt of the cap fitted within the outer end of the second tube 4 may be channeled, milled, knurled or otherwise formed for example in their spot-welding to create a multiplicity of air passages between the cap and the second tube which cannot lead to bursting of the sack due to their small individual cross-section.

The above-described shock absorber is particularly suited for mass production by virtue of the following features. Firstly, since neither the foot valve 14 nor the cap 6 need be connected to the first tube 1 by screw threading, the first tube 1 can be of thinner section than would otherwise be required. Secondly, the shock absorber can be readily filled with the damping medium by first fitting the sack 8 over the end of the first tube 1 and thereafter inverting the tube and filling the working chamber A through the end of the first tube remote from the sack without danger of entrapping any air due to the close fit of the sack about the first tube. Thirdly, due to the substantial distance between the sack 8 and the outer end of the second tube 4, the cap 6 can be secured within this end of the second tube 4 simply by welding.

I claim:

1. A shock absorber comprising a tube defining a working chamber, a piston mounted in said tube for axial movement against the resistance of fluid filling the working chamber, a piston rod extending from the piston and projecting through one end of said tube for connection to a first moving part, a foot valve closing the other end of said tube to control flow of fluid displaced from the working chamber by the piston rod, a second tube secured to the exterior of the first tube to project beyond the foot valve end of the first tube and to define a recuperation chamber including an annular gap between the cylindrical walls of the tubes, a flexible elastic sack having a skirt disposed in said gap to enclose a space on the opposite side of the foot valve to said working chamber to receive said displaced fluid, a cap secured to the free end of the second tube and adapted for connection to a second moving part and a sleeve having one end serving to wedge the rim of the sack between said tube walls with the other end of the sleeve abutting said cap.

2. A shock absorber according to claim 1, comprising a bead on the exterior of the sack in the vicinity of its rim which bead is wedged between said tube walls in the vicinity of their junction by said sleeve.

3. A shock absorber according to claim 1 wherein said sack is formed with a dished area overlying and convex towards said foot valve.

4. A shock absorber according to claim 1 wherein one end of the second tube is reduced in diameter and welded or brazed to said first tube.

5. A shock absorber according to claim 1 wherein said cap has a skirt welded inside the second tube.

6. A shock absorber according to claim 1 wherein said foot valve is mounted in a counterbored end of the first tube and retained by an inturned rim of the tube.

7. A shock absorber according to claim 1 wherein the recuperation chamber is vented to atmosphere by a hole in said cap.

8. A shock absorber according to claim 1 wherein the recuperation chamber is vented to atmosphere by a plurality of air passages formed in the connection between the second tube and the cap.

References Cited by the Examiner

UNITED STATES PATENTS

| 2,518,553 | 8/50 | Kieber | 188—100 |
| 2,640,693 | 6/53 | Magrum | 188—100 |
| 2,962,280 | 11/60 | Heiss | 188—100 |
| 3,021,926 | 2/62 | Wasdell | 188—100 |

FOREIGN PATENTS

| 523,726 | 11/53 | Belgium. |
| 1,075,097 | 10/54 | France. |

EUGENE G. BOTZ, *Primary Examiner*.